(12) United States Patent
Hung et al.

(10) Patent No.: US 8,146,207 B2
(45) Date of Patent: Apr. 3, 2012

(54) HINGE AND AN ELECTRONIC DEVICE WITH THE SAME

(75) Inventors: Shun-Yu Hung, Shulin (TW); Chung-Min Yeh, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 305 days.

(21) Appl. No.: 12/542,272

(22) Filed: Aug. 17, 2009

(65) Prior Publication Data

US 2011/0035905 A1 Feb. 17, 2011

(51) Int. Cl.
*E05D 3/10* (2006.01)
(52) U.S. Cl. .......................................... 16/367
(58) Field of Classification Search .................... 16/367, 16/337–339, 342, 330, 303, 340; 361/679.06, 361/679.07, 679.27; 455/90.3, 575.1, 575.3, 455/575.8; 379/433.12, 433.13; 348/373, 348/333.01, 333.06, 794
See application file for complete search history.

(56) References Cited

U.S. PATENT DOCUMENTS

| 7,984,533 B2* | 7/2011 | Wei et al. .......................... 16/367 |
| 2004/0083577 A1* | 5/2004 | Lu et al. ........................... 16/367 |
| 2005/0005399 A1* | 1/2005 | Lu et al. ........................... 16/367 |
| 2006/0021195 A1* | 2/2006 | Yamada et al. .................. 16/367 |
| 2006/0218750 A1* | 10/2006 | Tajima ............................. 16/367 |
| 2008/0034545 A1* | 2/2008 | Shieh .............................. 16/367 |
| 2008/0078060 A1* | 4/2008 | Chen ............................... 16/367 |
| 2008/0271293 A1* | 11/2008 | Hsu et al. ........................ 16/367 |
| 2009/0070958 A1* | 3/2009 | Chien ............................. 16/266 |

* cited by examiner

*Primary Examiner* — Chuck Y. Mah
(74) *Attorney, Agent, or Firm* — C. G. Mersereau; Nikolai & Mersereau, P.A.

(57) ABSTRACT

A hinge is mounted between a cover and a base of an electronic device and has a first actuating unit, a pivoting limit and a second actuating unit. The first actuating unit has two tops. The pivoting limit is mounted pivotally between the stops. The second actuating unit selectively abuts a first side and a second side of the pivoting limit. When the second actuating unit abuts one of the sides of the pivoting limit to pivot the pivoting limit, one of the sides of the pivoting limit abuts one of the stops to limit the rotating angle. With the pivot of the pivoting limit, the rotating angle is increased. Therefore, the cover of the electronic device is fully rotatable by 180 degrees in either direction, and the hinge still provides limiting function to protect inner wires.

8 Claims, 10 Drawing Sheets

HINGE AND AN ELECTRONIC DEVICE WITH THE SAME

BACKGROUND OF THE INVENTION

1. Field of the Invention

The present invention relates to a hinge and an electronic device with the same, especially to a hinge that is rotatable by 180 degrees both clockwise and anticlockwise.

2. Description of the Prior Arts

Conventional electronic devices such as notebook computers, cell phones and the like comprise a cover, a base and a conventional hinge. The conventional hinge is mounted between the cover and the base to allow the cover to be tilted and rotated relative to the base. To protect internal electrical wires, the conventional hinge has a limiting structure to prevent the cover from over rotating. The limiting structure comprises a stationary limit and a rotating limit respectively connected to the base and the cover. So when the cover is rotated about a longitudinal axis to adjust a viewing angle of a screen, the rotating limit abuts the stationary limit to limit the rotation of the cover.

Conventionally, both the rotating limit and the stationary limit have certain, tangible sizes, and are firmly provided on the cover and base respectively so that those elements, though they prevent the wires from damage, also prevent the cover from being rotated clockwise and anticlockwise by 180 degrees relative to the base. There are several ways to overcome the shortcomings, but most require complicated designs so are costly to implement and may not be as reliable in use.

Therefore, the present invention provides a hinge and an electronic device with the hinge to mitigate or obviate the aforementioned problems.

SUMMARY OF THE INVENTION

The main objective of the present invention is to provide a hinge that is rotatable by 180 degrees in two planes. The hinge is mounted between a cover and a base of an electronic device and has a first actuating unit, a pivoting limit and a second actuating unit. The first actuating unit has two tops. The pivoting limit is mounted pivotally between the stops. The second actuating unit selectively abuts a first side and a second side of the pivoting limit. When the second actuating unit abuts one of the sides of the pivoting limit to pivot the pivoting limit, one of the sides of the pivoting limit abuts one of the stops to limit the rotating angle. With the pivot of the pivoting limit, the rotating angle is increased. Therefore, the cover of the electronic device is rotatable by a full 180 degrees in both directions, and the hinge still provides limiting function to protect inner wires.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
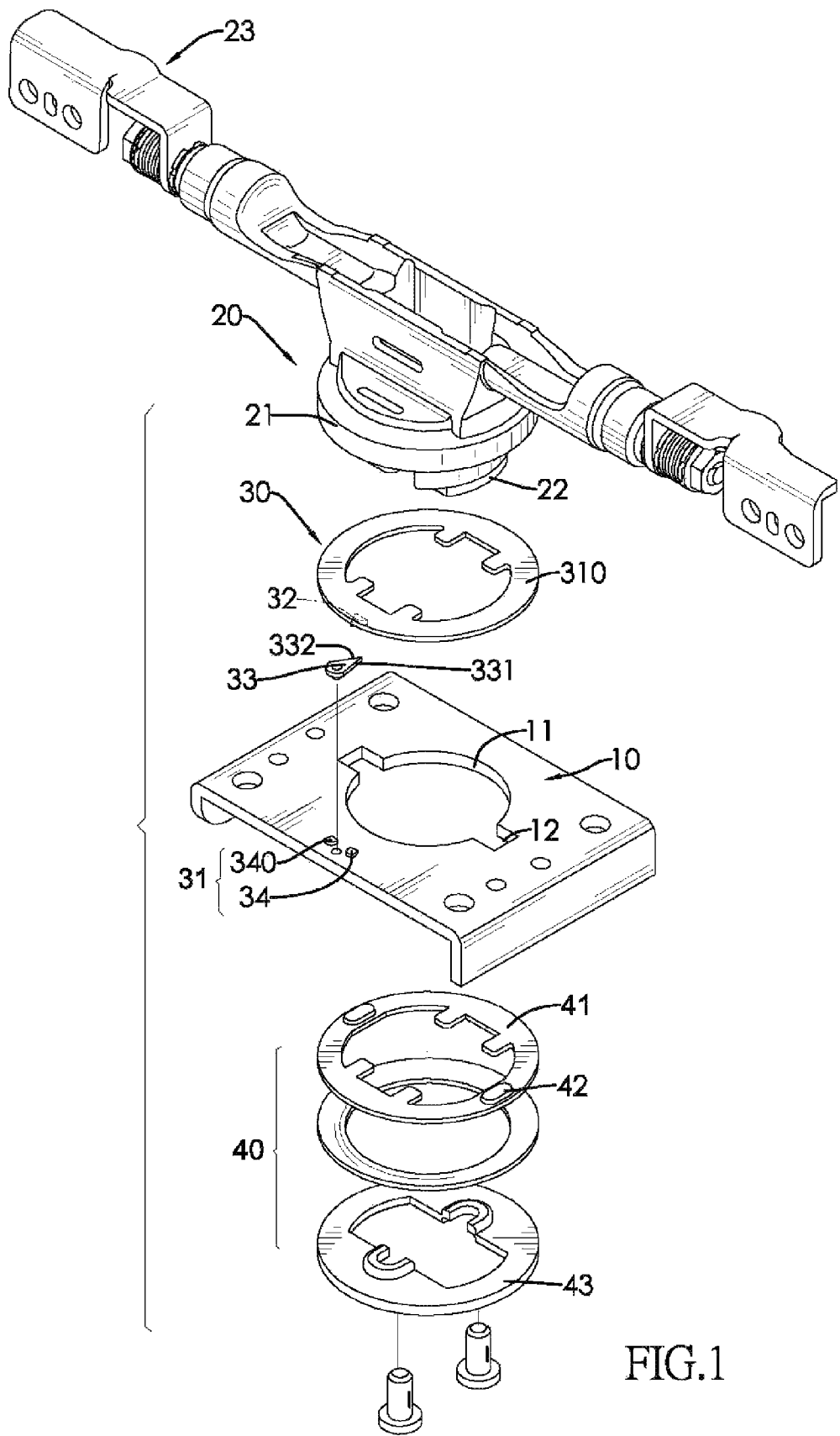
FIG. 1 is an exploded perspective view of a first embodiment of a hinge in accordance with the present invention.

With reference to FIG. 1, a hinge in accordance with the present invention comprises a seat (10), a central bracket (20), a washer assembly (40) and a limiting assembly (30).

The seat (10) is U-shaped in cross section and has a top surface, a bottom surface, a pivoting hole (11) and two positioning recesses (12). The pivoting hole (11) is formed through the top and bottom surfaces. The positioning recesses (12) are formed through the top and bottom surfaces and communicate with the pivoting hole (11).

The central bracket (20) is connected to the seat (10) and has a body (21), a pivoting shaft (22) and two tilting assemblies (23). The pivoting shaft (22) is formed on and protrudes out from a bottom of the body (21) and is mounted rotatably through the pivoting hole (11) of the seat (10). The tilting assemblies (23) are attached respectively to and protrude transversely out from two sides of the body (21).

The washer assembly (40) is mounted around the pivoting shaft (22) and comprises a limiting washer (310), a positioning washer (41) and a fastening washer (43). The limiting washer (310) is mounted securely around the pivoting shaft (21) adjacent to the top surface of the seat (10). The positioning washer (41) is mounted securely around the pivoting shaft (21) adjacent to the bottom surface of the seat (10) and has two positioning protrusions (42). The positioning protrusions (42) are formed on a top surface of the positioning washer (41) and selectively engage the positioning recesses (12) of the seat (10) to provide positioning function. The fastening washer (43) is attached securely to an end of the pivoting shaft (21) to hold the washer assembly (40) and the seat (10) firmly.

Figure 7A:
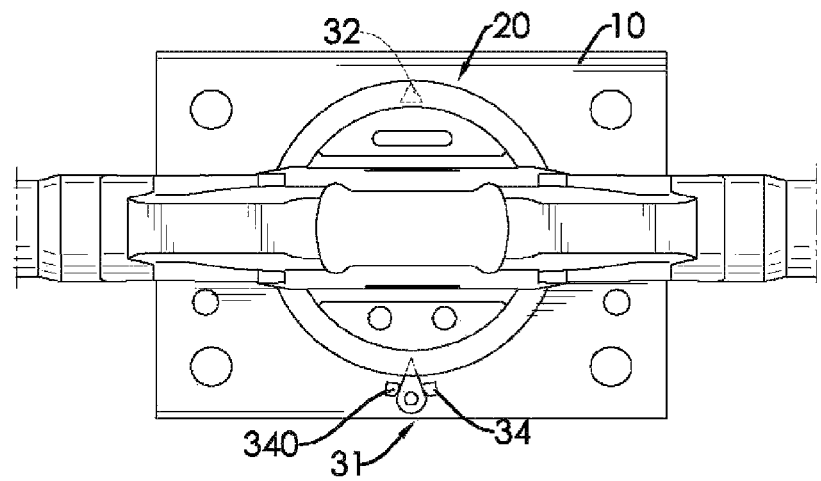
FIGS. 7A to 7C are operational top views of the binge in FIG. 1.
Figure 7B:
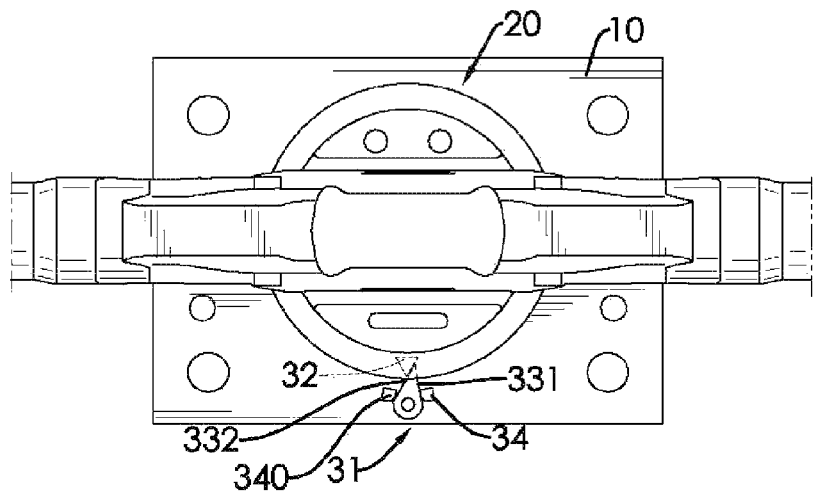
Figure 7C:
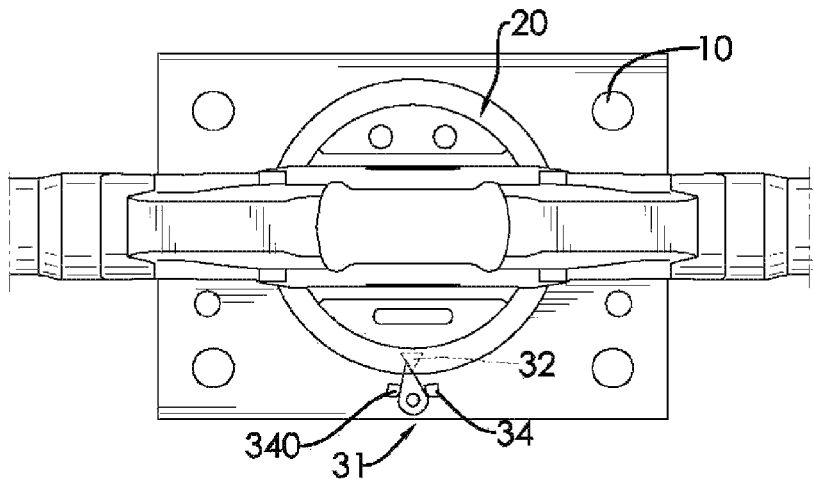

With further reference to FIGS. 7A, 7B and 7C, the limiting assembly (30) is mounted between the seat (10) and the central bracket (20) and comprises a first actuating unit (31), a pivoting limit (33) and a second actuating unit (32). The first actuating unit (31) comprises a first stop (34) and a second stop (340). The pivoting limit (33) is mounted pivotally between the first and second stops (34, 340) and has a first side (331) and a second side (332). The second actuating unit (32) selectively abuts the first and second sides (331, 332) of the pivoting limit (33) When the second actuating unit (32) abuts one of the sides (331, 332) of the pivoting limit (33) to pivot the pivoting limit (33), one of the sides (331, 332) of the pivoting limit (33) abuts one of the stops (34, 340) to limit the rotating angle of the pivoting shaft (22). In a preferred embodiment, the first side (331) is adjacent to and selectively abuts the first stop (34) when the second actuating unit (32) abuts the second side (332), and the second side (332) is adjacent to and selectively abuts the second stop (340) when the second actuating unit (32) abuts the first side (331).

Figure 4:
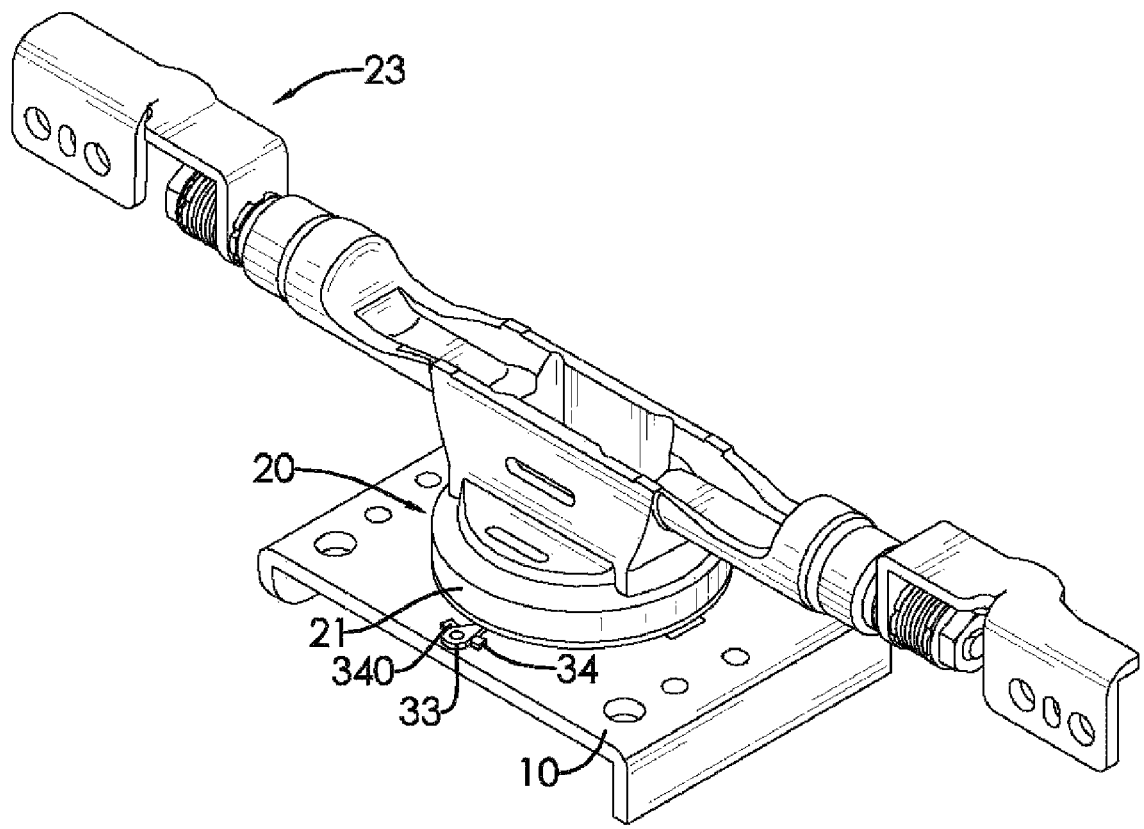
FIG. 4 is a perspective view of the hinge in FIG. 1.

With reference to FIGS. 1, 4 and 7, in a first preferred embodiment, the stops (34, 340) of the first actuating unit (31) are formed on the top surface of the seat (10). The pivoting limit (33) is mounted pivotally on the top surface of the seat (10). The second actuating unit (32) is formed on a bottom surface of the limiting washer (310).

Figure 2:
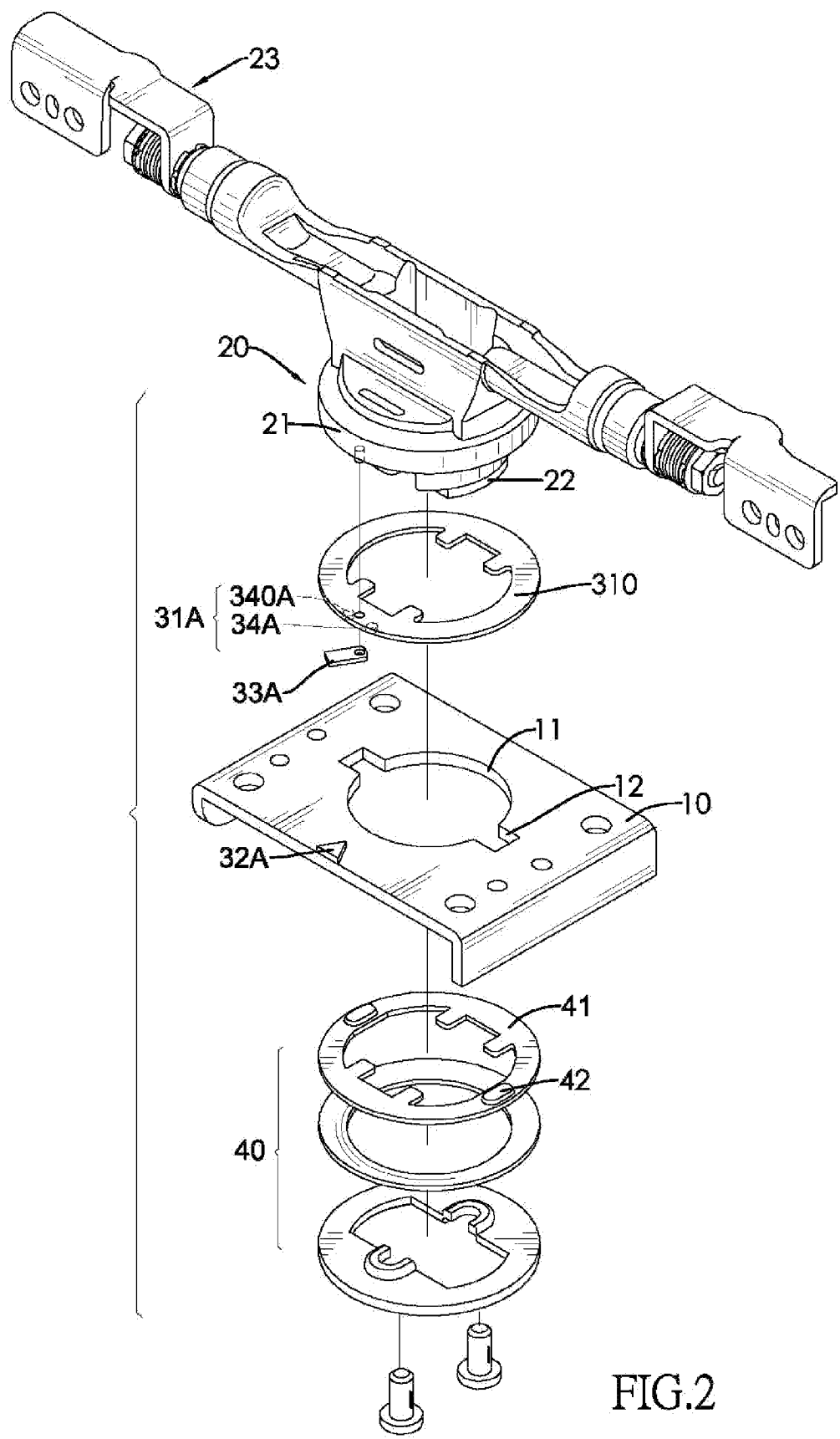
FIG. 2 is an exploded perspective view of a second embodiment of a hinge in accordance with the present invention.
Figure 5:
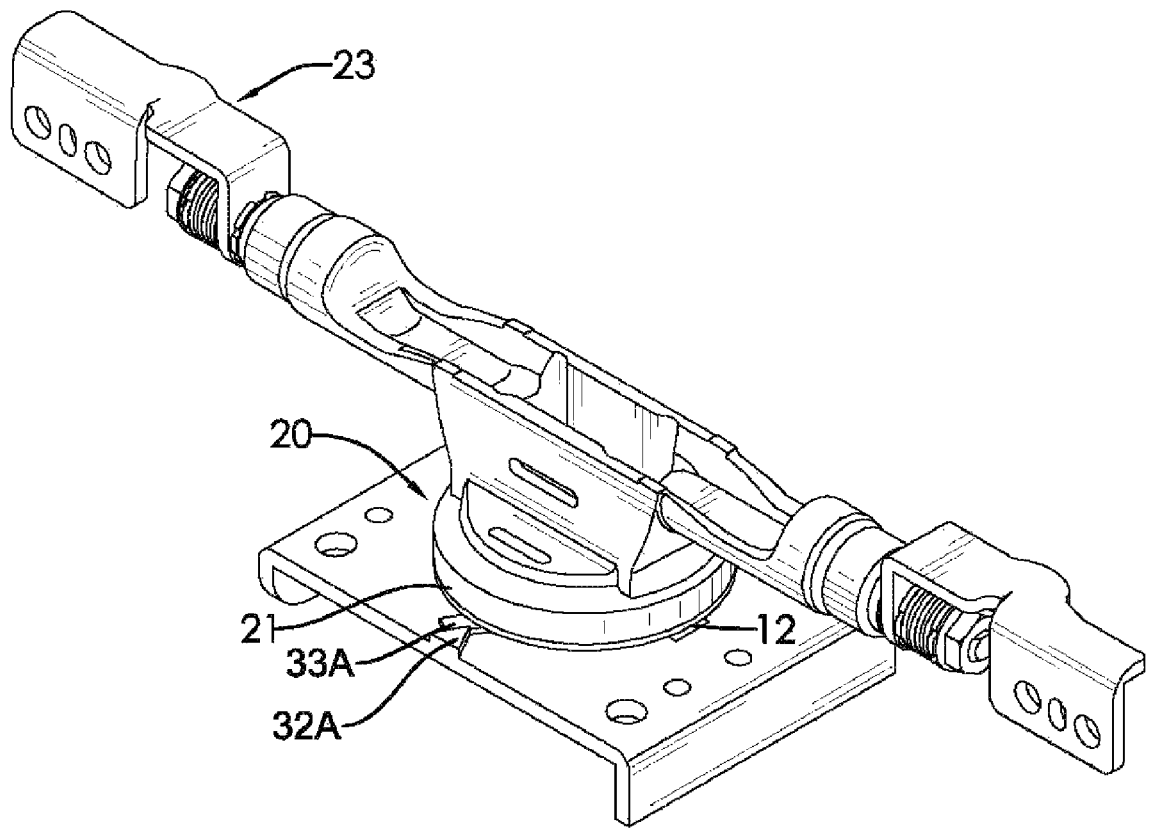
FIG. 5 is a perspective view of the hinge in FIG. 2.
Figure 8A:
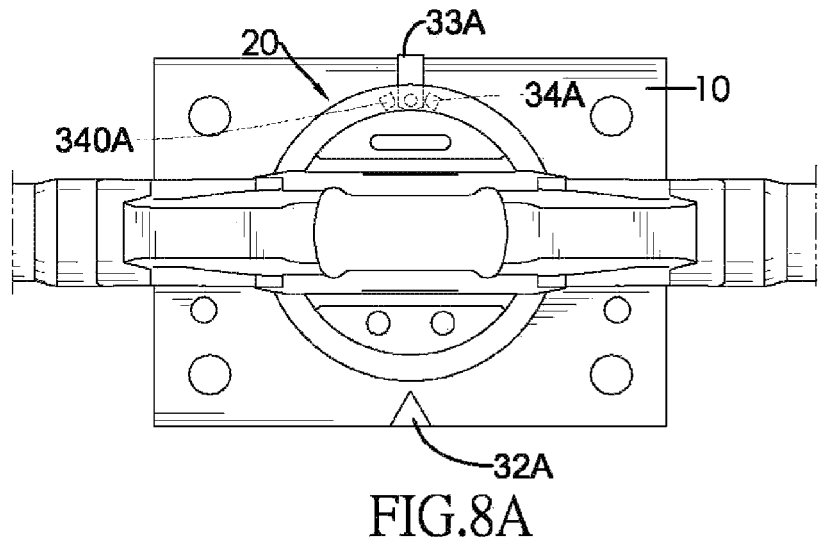
FIGS. 8A to 8C are operational top views of the hinge in FIG. 2.
Figure 8B:
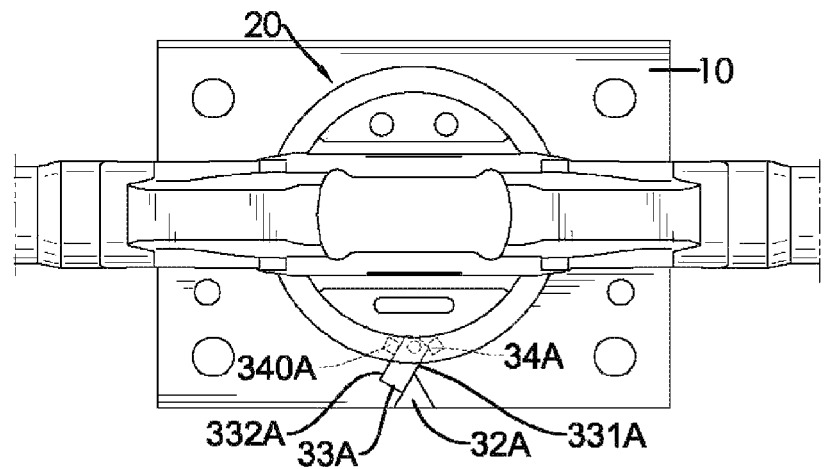

With reference to FIGS. 2, 5 and 8, in a second preferred embodiment, the stops (34A, 340A) of the first actuating unit (31A) are formed on a bottom surface of the limiting washer (310). The pivoting limit (33A) is an elongated bar and is mounted pivotally on the bottom surface of the limiting washer (310). The second actuating unit (32A) is triangular and is formed on the top surface of the seat (20).

Figure 3:
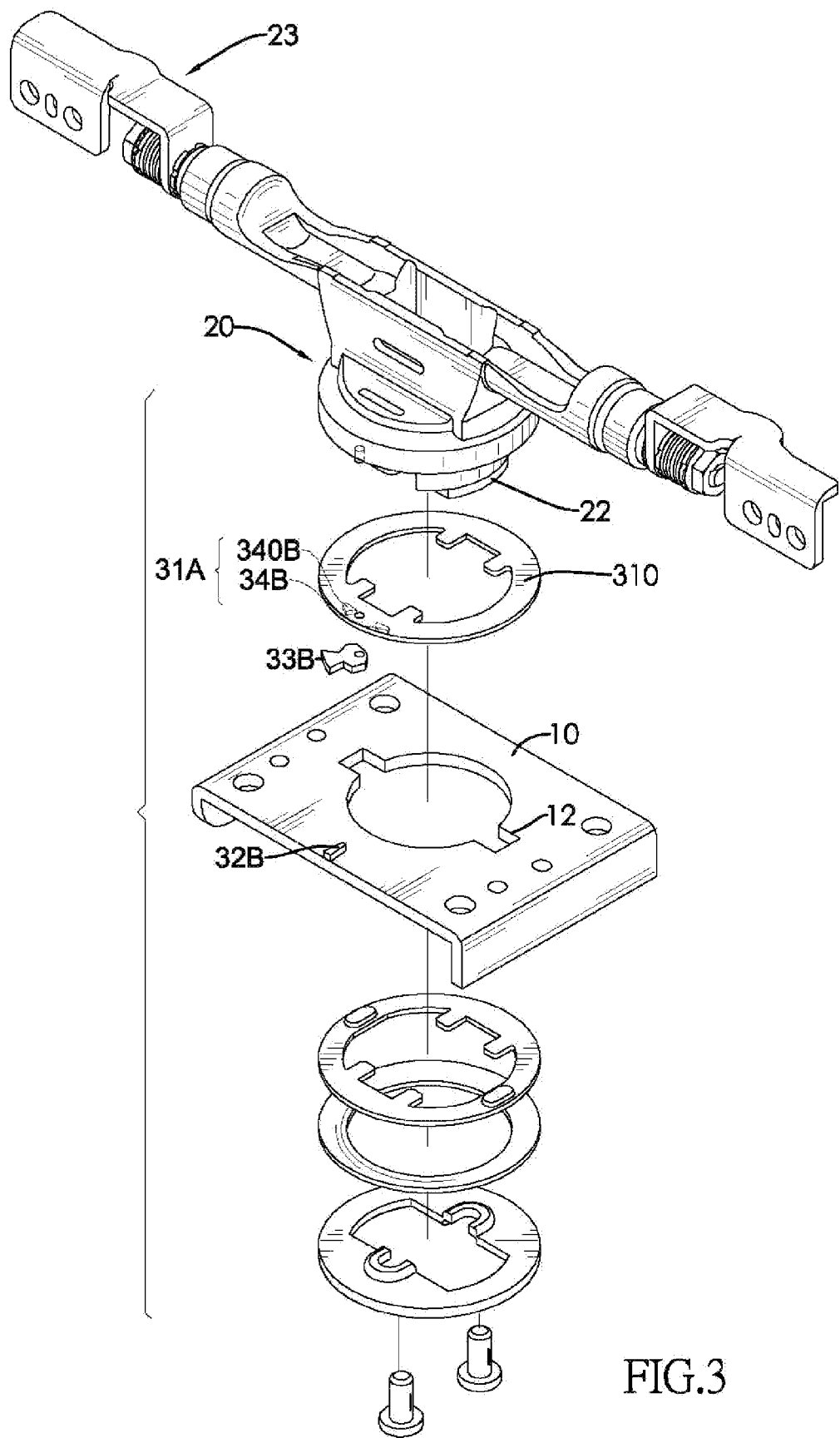
FIG. 3 is an exploded perspective view of a third embodiment of a hinge in accordance with the present invention.
Figure 6:
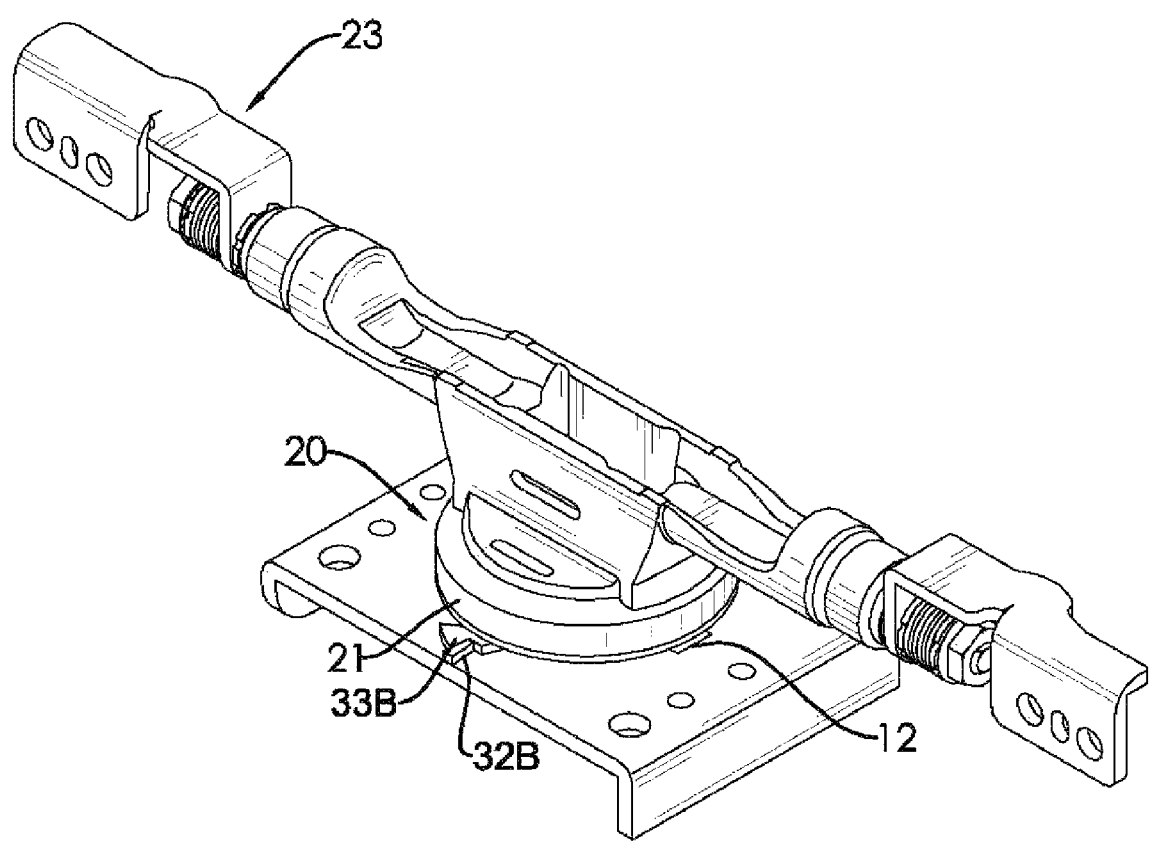
FIG. 6 is a perspective view of the hinge in FIG. 3.
Figure 9A:
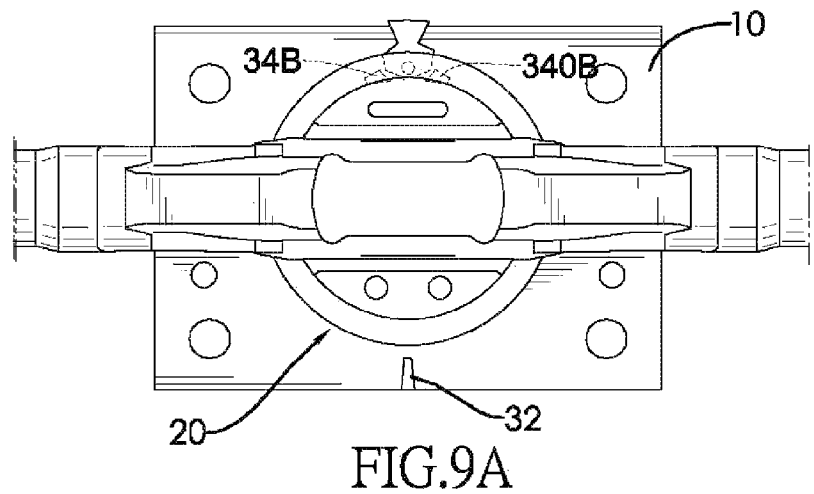
FIGS. 9A to 9C are operational top views of the hinge in FIG. 3.
Figure 9B:
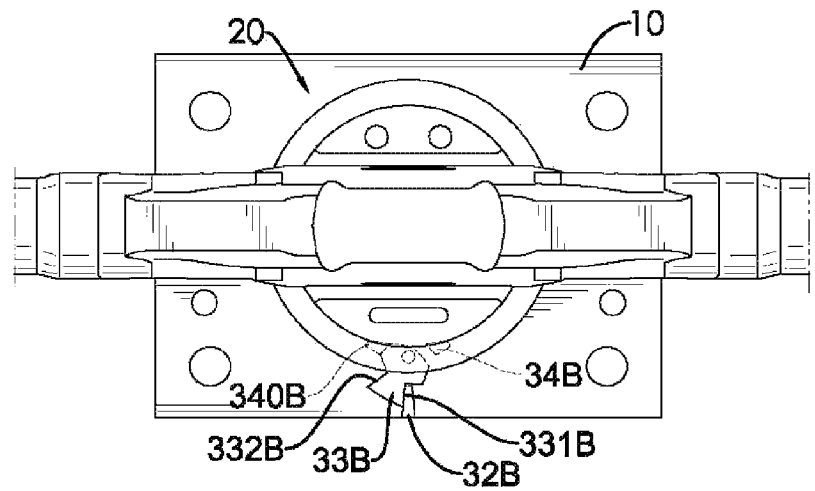

With reference to FIGS. 3, 6 and 9, in a third preferred embodiment, the stops (34B, 340B) of the first actuating unit (31B) are formed on a bottom surface of the limiting washer (310). The pivoting limit (33B) is calabash-shaped and is mounted pivotally on the bottom surface of the limiting washer (310). The second actuating unit (32B) is an elongated bar and is formed on the top surface of the seat (20).

Figure 10:
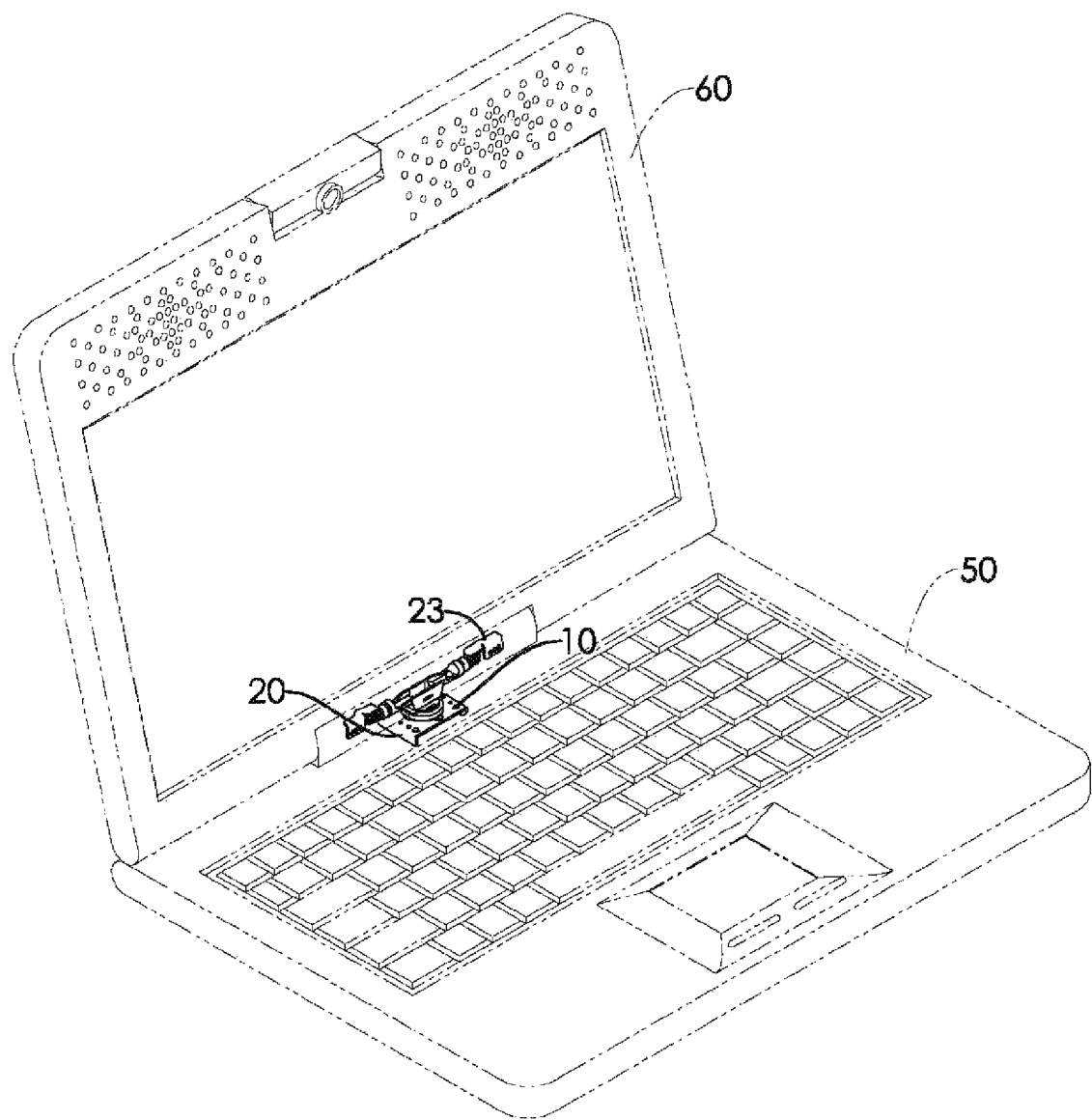
FIG. 10 is a perspective view of a portable electronic device in accordance with the present invention with the hinge in FIG. 1.

With reference to FIG. 10, an electronic device in accordance with the present invention comprises a base (50), a cover (60) and a hinge as described. The hinge is mounted between the cover (60) and the base (50) to connect the cover (60) pivotally to the base (50). The seat (10) is attached to the base (50). The tilting assemblies (20) are attached to the cover (60).

With further reference to FIG. 7A, the cover (60) is opened and is not rotated yet.

With further reference to FIG. 7B, the cover (60) is rotated anticlockwise. The second actuating unit (32) is rotated with the central bracket (20). When the second actuating unit (32) abuts the second side (332) of the pivoting limit (33), the pivoting limit (33) is pivoted until the first side (331) of the pivoting limit (33) abuts the first stop (34).

With further reference to FIG. 7C, the cover is rotated clockwise. The second actuating unit (32) is rotated with the central bracket (20). When the second actuating unit (32) abuts the first side (331) of the pivoting limit (33), the pivoting limit (33) is pivoted until the second side (332) of the pivoting limit (33) abuts the second stop (340).

With further reference to FIGS. 8A, 8B, 9A and 9B, the pivoting limit (33A, 33B) is rotated anticlockwise with the central bracket (20). When the first side (331A, 331B) abuts the second actuating unit (32A, 32B), the pivoting limit (33A, 33B) is pivoted until the second side (332A, 332B) of the pivoting limit (33A, 33B) abuts the second stop (340A, 340B).

Figure 8C:
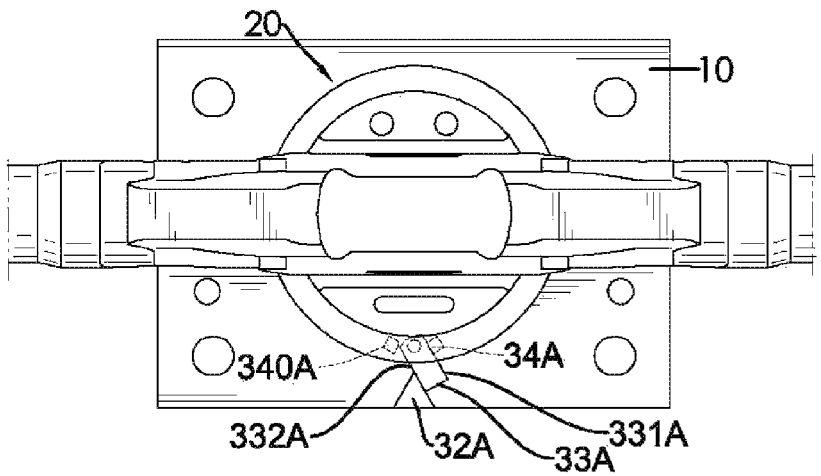
Figure 9C:
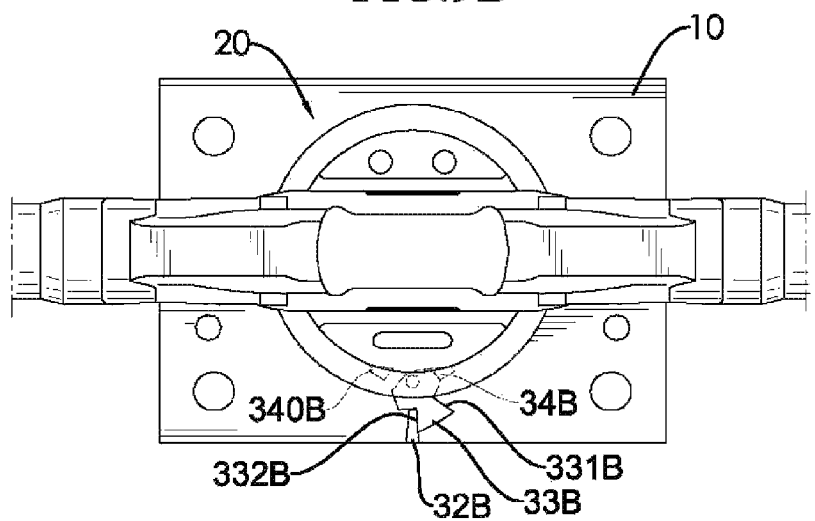

With further reference to FIGS. 8C and 9C, the pivoting limit (33A, 33B) is rotated clockwise with the central bracket (20). When the second side (332A, 332B) abuts the second actuating unit (32A, 32B), the pivoting limit (33A, 33B) is pivoted until the first side (331A, 331B) of the pivoting limit (33A, 33B) abuts the first stop (34A, 34B).

The hinge and the electronic device as described have following advantages. With the pivot of the pivoting limit (33), the rotating angle of the central bracket (20) is increased. The increased rotating angle remedies the angles occupied by the pivoting limit (33) and the second actuating unit (32). Then the central bracket (20) and the cover (60) are rotatable by 180 degrees either clockwise or anticlockwise. Therefore, the cover (60) has a full range of viewing angles and the hinge as described also provides limiting function to protect the interior wires.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
a seat;
a central bracket connected to the seat and having
   a body;
   a pivoting shaft formed on and protruding out from a bottom of the body and mounted rotatably through the seat; and
   two tilting assemblies attached respectively to and protruding transversely out from two sides of the body;
a limiting assembly mounted between the seat and the central bracket and comprising
   a first actuating unit comprising a first stop and a second stop;
   a pivoting limit mounted pivotally between the first and second stops and having a first side and a second side; and
   a second actuating unit selectively abutting the first and second sides of the pivoting limit, wherein when the second actuating unit abuts one of the sides of the pivoting limit to pivot the pivoting limit, one of the sides of the pivoting limit abuts one of the stops to limit the rotating angle of the pivoting shaft;
wherein the first side of the pivoting limit is adjacent to and selectively abuts the first stop when the second actuating unit abuts the second side of the pivoting limit;
wherein the second side is adjacent to and selectively abuts the second stop when the second actuating unit abuts the first side of the pivoting limit;
wherein the hinge further comprises a washer assembly having a limiting washer mounted securely around the pivoting shaft and located between the seat and the central bracket;
wherein the stops of the first actuating unit are formed on a bottom surface of the limiting washer;
wherein the pivoting limit is an elongated bar and is mounted pivotally on the bottom surface of the limiting washer; and
wherein the second actuating unit is triangular and is formed on a top surface of the seat.

2. The hinge as claimed in claim 1, wherein
the seat has
   a pivoting hole mounted around the pivoting shaft; and
   two positioning recesses formed through the top surface and a bottom surface of the seat and communicating with the pivoting hole;
the washer assembly comprises
   a positioning washer mounted securely around the pivoting shaft adjacent to the bottom surface of the seat and having
      two positioning protrusions formed on a top surface of the positioning washer and selectively engaging the positioning recesses of the seat; and
   a fastening washer attached securely to an end of the pivoting shaft.

3. A hinge comprising:
a seat;
a central bracket connected to the seat and having
   a body;
   a pivoting shaft formed on and protruding out from a bottom of the body and mounted rotatably through the seat; and
   two tilting assemblies attached respectively to and protruding transversely out from two sides of the body;

a limiting assembly mounted between the seat and the central bracket and comprising
 a first actuating unit comprising a first stop and a second stop;
 a pivoting limit mounted pivotally between the first and second stops and having first side and a second side; and
 a second actuating unit selectively abutting the first and second sides of the pivoting limit, wherein when the second actuating unit abuts one of the sides of the pivoting limit to pivot the pivoting limit, one of the sides of the pivoting limit abuts one of the stops to limit the rotating angle of the pivoting shaft;
wherein the first side of the pivoting limit is adjacent to and selectively abuts the first stop when the second actuating unit abuts the second side of the pivoting limit;
wherein the second side is adjacent to and selectively abuts the second stop when the second actuating unit abuts the first side of the pivoting limit;
wherein the hinge further comprises a washer assembly having a limiting washer mounted securely around the pivoting shaft and located between the seat and the central bracket;
wherein the stops of the first actuating unit are formed on a bottom surface of the limiting washer;
wherein the pivoting limit is calabash-shaped and is mounted pivotally on the bottom surface of the limiting washer; and
wherein the second actuating unit is an elongated bar and is formed on a top surface of the seat.

4. The hinge as claimed in claim 3, wherein
the seat has
 a pivoting hole mounted around the pivoting shaft; and
 two positioning recesses formed through the top surface and a bottom surface of the seat and communicating with the pivoting hole;
the washer assembly comprises
 a positioning washer mounted securely around the pivoting shaft adjacent to the bottom surface of the seat and having
  two positioning protrusions formed on a top surface of the positioning washer and selectively engaging the positioning recesses of the seat; and
 a fastening washer attached securely to an end of the pivoting shaft.

5. An electronic device comprising:
a base;
a cover connected pivotally to the base; and
a hinge attached to the base and the cover and having
 a seat attached to the base;
 a central bracket connected to the seat and having
  a body;
   a pivoting shaft formed on and protruding out from a bottom of the body and mounted rotatably through the seat; and
   two tilting assemblies attached respectively to and protruding transversely out from two sides of the body and attached to the cover;
 a limiting assembly mounted between the seat and the central bracket and comprising
  a first actuating unit comprising a fist stop and a second stop;
  a pivoting limit mounted pivotally between the first and second stops and having a first side and a second side; and
  a second actuating unit selectively abutting the first and second sides of the pivoting limit, wherein when the second actuating unit abuts one of the sides of the pivoting limit to pivot the pivoting limit, one of the sides of the pivoting limit abuts one of the stops to limit the rotating angle of the pivoting shaft;
wherein the first side of the pivoting limit is adjacent to and selectively abuts the first stop when the second actuating unit abuts the second side of the pivoting limit;
wherein the second side is adjacent to and selectively abuts the second stop when the second actuating unit abuts the first side of the pivoting limit;
wherein the hinge further comprises a washer assembly having a limiting washer mounted securely around the pivoting shaft and located between the seat and the central bracket;
wherein the stops of the first actuating unit are formed on a bottom surface of the limiting washer;
wherein the pivoting limit is an elongated bar and is mounted pivotally on the bottom surface of the limiting washer; and
wherein the second actuating unit is triangular and is formed on a top surface of the seat.

6. The electronic device as claimed in claim 5, wherein
the seat has
 a pivoting hole mounted around the pivoting shaft; and
 two positioning recesses formed through the top surface and a bottom surface of the seat and communicating with the pivoting hole;
the washer assembly comprises
 a positioning washer mounted securely around the pivoting shaft adjacent to the bottom surface of the seat and having
  two positioning protrusions formed on a top surface of the positioning washer and selectively engaging the positioning recesses of the seat; and
 a fastening washer attached securely to an end of the pivoting shaft.

7. An electronic device comprising:
a base;
a cover connected pivotally to the base; and
a hinge attached to the base and the cover and having
 a seat attached to the base;
 a central bracket connected to the seat and having
  a body;
   a pivoting shaft formed on and protruding out from a bottom of the body and mounted rotatably through the seat; and
   two tilting assemblies attached respectively to and protruding transversely out from two sides of the body and attached to the cover;
 a limiting assembly mounted between the seat and the central bracket and comprising
  a first actuating unit comprising a first stop and a second stop;
  a pivoting limit mounted pivotally between the first and second stops and having a first side and a second side; and
  a second actuating unit selectively abutting the first and second sides of the pivoting limit, wherein when the second actuating unit abuts one of the sides of the pivoting limit to pivot the pivoting limit, one of the sides of the pivoting limit abuts one of the stops to limit the rotating angle of the pivoting shaft;

wherein the first side of the pivoting limit is adjacent to and selectively abuts the first stop when the second actuating unit abuts the second side of the pivoting limit;

wherein the second side is adjacent to and selectively abuts the second stop when the second actuating unit abuts the first side of the pivoting limit;

wherein the hinge further comprises a washer assembly having a limiting washer mounted securely around the pivoting shaft and located between the seat and the central bracket, wherein wherein the stops of the first actuating unit are formed on a bottom surface of the limiting washer;

wherein the pivoting limit is calabash-shaped and is mounted pivotally on the bottom surface of the limiting washer; and wherein the second actuating unit is an elongated bar and is formed on a top surface of the seat.

8. The electronic device as claimed in claim 7, wherein the seat has
- a pivoting hole mounted around the pivoting shaft; and
- two positioning recesses formed through the top surface and a bottom surface of the seat and communicating with the pivoting hole;

the washer assembly comprises
- a positioning washer mounted securely around the pivoting shaft adjacent to the bottom surface of the seat and having
  - two positioning protrusions formed on a top surface of the positioning washer and selectively engaging the positioning recesses of the seat; and
- a fastening washer attached securely to an end of the pivoting shaft.

* * * * *